United States Patent [19]

Mossot

[11] Patent Number: 4,730,723
[45] Date of Patent: Mar. 15, 1988

[54] HOOKING DEVICE FOR CONVEYOR ROLLER

[75] Inventor: Bernard Mossot, Fontainebleau, France

[73] Assignee: Equipement Minier, Seichamps, France

[21] Appl. No.: 41,433

[22] Filed: Apr. 15, 1987

[30] Foreign Application Priority Data

Apr. 17, 1986 [FR] France .................................. 86 05537

[51] Int. Cl.⁴ .............................................. B65G 39/10
[52] U.S. Cl. .................................... 198/827; 198/828
[58] Field of Search .............. 198/827, 828; 193/35 F, 193/35 R, 37

[56] References Cited

FOREIGN PATENT DOCUMENTS

| | | |
|---|---|---|
| 1265651 | 4/1968 | Fed. Rep. of Germany ...... 198/827 |
| 1912435 | 10/1970 | Fed. Rep. of Germany ...... 198/827 |
| 1510672 | 1/1968 | France .................................. 198/827 |
| 56-43118 | 4/1981 | Japan .................................... 198/827 |
| 1352273 | 5/1974 | United Kingdom . |
| 2116931 | 4/1983 | United Kingdom . |

*Primary Examiner*—Robert J. Spar
*Assistant Examiner*—Cheryl L. Gastineau
*Attorney, Agent, or Firm*—Browdy and Neimark

[57] ABSTRACT

A hooking device for conveyor roller comprises an internally threaded casing, the bottom of which is fitted externally with a hook, and a hollow roller holding nut provided with an external thread adapted to screw into the inside of the casing. The hook of the casing is provided with parallel outwardly protruding stiffening membranes and the casing and nut are in moulded plastic material. The plastic material preferably comprises fibreglass filler to a content advantageously greater than 30%.

10 Claims, 3 Drawing Figures

HOOKING DEVICE FOR CONVEYOR ROLLER

This invention concerns a hooking device for a roller of a conveyor belt.

It is known that a conveyor belt is a belt on which objects or bulk material rest and which is guided on transverse guide rollers.

It is known that rollers are used consisting of a cable, a bar (or similar element) equipped with hooking devices at both ends and on which adjacent disks forming rollers are mounted.

Applications exist in which the rollers must work under severe environmental conditions, as much from the mechanical and thermal standpoints as from the corrosion standpoint (corrosion by acids, bases, salts, oils, aromatics . . . ).

Conventionally, the hooking devices are casings provided with hooks and closed off by cable (or bar) holding nuts and are manufactured in case-iron, requiring successive operations of machining, tapping to form the threads forming the junction between the casing and the nut, and surface treatment for protection purposes. This results in hooks of considerable weight and a high cost but which in certain cases offer only mediocre corrosion resistance.

The object of the invention is to remedy these disadvantages, proposing for this purpose a hooking device for a conveyor roller comprising an internally threaded casing, the bottom of which is provided externally with a hook and a hollow nut for holding the roller comprising external threading as appropriate for screwing into the inside of the casing, characterized in that the hook of the casing is provided with parallel stiffening winged ribs or membranes and the casing and nut are in moulded plastic material.

Substitution of moulded plastic material for the cast-iron enables the weight of the hooking device to be considerably lightened, with weight reductions of up to ¼. Furthermore, manufacture of the casing by moulding offers the advantage of requiring neither machining nor surface treatment. Thanks to the stiffening membranes, this hooking device in moulded plastic material offers just as good a mechanical strength as does cast-iron (or even better in the event of impacts), and also better corrosion behaviour; the casings and nuts keep being separable, even after attack by acids, bases, salts, which was not the case with cast-iron. The hooking devices also ensure excellent thermal behaviour within a range of about $-40°$ C. to $+150°$ C.

Advantageously, the moulded plastic material will comprise fibreglass filler, preferably to a content of above 30%, for example 40%, thus ensuring an acceptable compromise between mouldability and the provision of satisfactory mechanical strength.

In accordance with various preferred features of the invention:

the hook consists of a curved layer of generally constant thickness, preferably in a U profile with two parallel flanges inclined with relation to the centreline of the casing; the stiffening membranes have a thickness measured parallel to the layer that is less than (or equal to) the thickness of this layer and a protruding dimension, measured perpendicular to this layer, that is appreciably constant in the vicinity of the free end (or beak) of the latter;

the hook is bordered along each side by a stiffening membrane, the protruding dimension of which is preferably less than those of the other membranes, with a gap with respect to respectively adjacent membranes that is less than the gap between said other membranes;

these intermediate membranes are odd in number and have the same protruding dimension and the same gap;

the casing and nut have square form threads.

The objects, characteristics and advantages of the invention will be understood from the description that follows, which is given as an illustrative example, with reference to the appended drawing in which.

Figure 1:
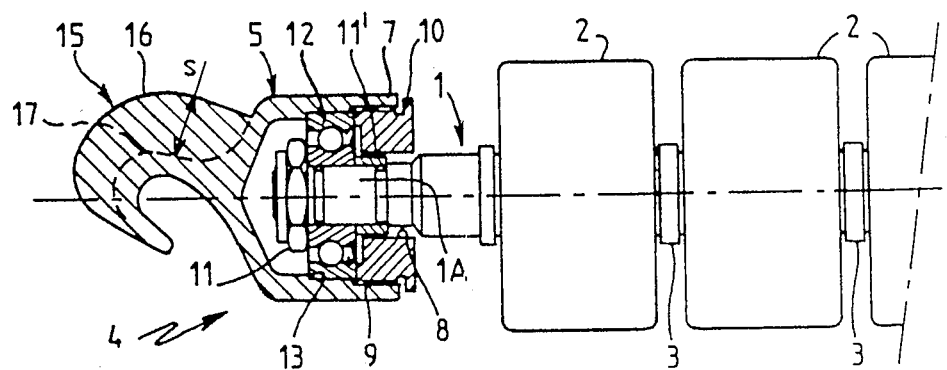
FIG. 1 is a partial side view of a conveyor roller ending in a hooking device in accordance with the invention and shown as an axial section.

FIG. 1 is an illustrative example of a conveyor roller consisting here of a cable or bar 1 on which are inserted disks 2 separated by spacer rings 3 adapted to carry the conveyor belt (not shown).

The ends of the cable are fitted with two hooking devices 4, with only the left one being shown in FIG. 1, which are intended for putting the roller in traction.

Figure 2:
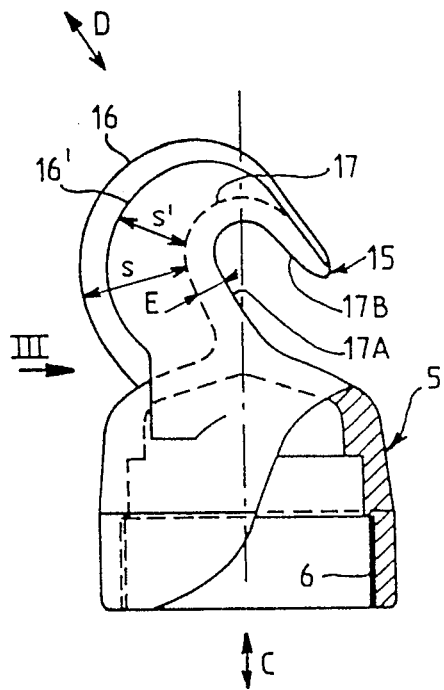
FIG. 2 is a profile view of this hooking device on larger scale and partly cut away.
Figure 3:
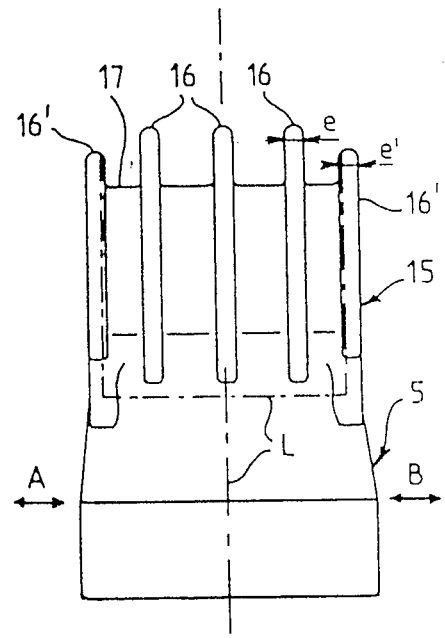
FIG. 3 is another profile view along arrow III of FIG. 2.

As shown in FIGS. 1 to 3, this hooking device 4 comprises a casing 5 of generally cylindrical form fitted with an internal square form thread 6 and a nut 7 pierced by a central bore 8 and provided with an external square from thread 9 matching the internal thread 6 of the casing.

This nut ends in a polygonal collar 10 enabling the nut to be held so as to screw it into the casing 5.

A thinner end 1A of cable 1, forming an attachment for the roller, extends through the central bore 8 of the nut, and is ended by a threaded terminal portion to which is secured a nut 11. The periphery of this nut 11 presses axially via a support ring 11' against the internal race of a ball-bearing 12, the outer race of which is axially blocked between nut 7 and a shoulder 13 provided in the inside of the casing. The hooking device is thus free to rotate around its axis with relation to cable 1.

As shown more specifically in FIGS. 2 and 3, the casing 5 carries on its bottom a hook 15 adapted to hook onto a ring or holding bar (not shown).

This hook 15 is provided with stiffening blades, winged ribs, vanes or membranes 16 the protruding dimension of which (s or s'), measured perpendicular to the external surface of the hook, is normally much greater than their thickness e, measured parallel to this external surface (see FIGS. 2 and 3 respectively).

This hook 15 is formed here of a curved sheet or layer 17 of approximately constant thickness E, slightly greater than the thickness of the stiffening membranes. This layer has a U profile with parallel flanges 17A and 17B that are inclined with relation to the centreline of the casing. This facilitates the casing moulding operations.

This layer, of appreciably constant width, is edged along its sides by two lateral stiffening membranes 16' that are smaller than the intermediate membranes 16. The gap between a side membrane 16' and an intermediate membrane 16 is less than the gap between two intermediate membranes. The lateral membranes 16' are identical to each other, as also are all the intermediate membranes 16.

The number of membranes is odd so as to endow the casing with a plane of symmetry passing through the thickness of a median membrane (see FIG. 1), thus endowing the hook with better mechanical strength.

Except in the vicinity of the beak of the hook, the protruding dimensions of the stiffening membranes are generally constant. These protruding dimensions have a minimum value on the side 17B of the layer to facilitate moulding.

The casing consists of moulded plastic, advantageously filled with fibreglass preferably to a content of more than 30%, or even equal to 40%. For example, the plastic could be a plastic sold under the trademark "6-2 STARGLAS PBT" (standard 40-V). As a general rule, it is preferable to use a plastic material with a tensile strength of greater than 200 N/mm$^2$ and an elongation on fracture of about 1 to 2% only, with a density in the range of 1.5–1.6 g/cm$^3$.

This casing 5 can be moulded at low pressure (for example 1 to 2 bars) by means of 4 mould sections. Some separation lines between these mould sections are shown by dashed lines in FIG. 3. Two parts of the mould ensure the conformation of the casing, the inside of the hook and its side faces and can be moved in accordance with the double arrows A and B. Another part ensures the internal conformation of the casing and can be moved in a helical movement around the double arrow C, whilst a fourth part provides the conformation of the stiffening membranes and external surface of the curved layer 17 and can be moved parallel to sides 17A and 17B in accordance with the double arrow D of FIG. 2.

Naturally, the aforegoing description is proposed only as an illustrative example and many variants can be proposed by the man of the art without going beyond the framework of the invention. In particular, for instance, the casing and nut can consist of different moulded materials.

I claim:

1. A hooking device for conveyor roller means comprising an internally threaded casing, the bottom of which is provided externally with a hook, and a hollow roller holding nut provided with external threading matched so as to screw into the inside of said casing, said hook of said casing being outwardly provided with a plurality of parallel stiffening winged ribs, the protruding dimension of which being normally greater than their width, and said casing and nut being in moulded plastic material said conveyor roller means supported by an elongated rotatable support means having one end passing through the opening in said hollow roller holding nut and being rotatably supported within said casing by a bearing means.

2. A hooking device in accordance with claim 1, wherein said hook consists of a curved layer of generally constant thickness and that said stiffening winged ribs have a thickness measured parallel to said layer that is less than the thickness (E) of said layer.

3. A hooking device in accordance with claim 2, wherein said layer is folded so as to present a U profile with parallel sides inclined with relation to the centreline of said casing.

4. A hooking device in accordance with claim 2, wherein the protruding dimension of each winged rib, measured perpendicular to the layer, is appreciably constant apart from the beak of the hook.

5. A hooking device in accordance with claim 1 wherein said hook is bordered along each of its sides by one lateral stiffening winged rib in said plurality.

6. A hooking device in accordance with claim 5, wherein said lateral winged ribs have a protruding dimension less than that the protruding dimension of the other winged ribs of said plurality and with a gap separating said lateral winged ribs from the respectively adjacent winged ribs in said plurality that is less than the gap between the other winged ribs in said plurality.

7. A hooking device in accordance with claim 6, wherein said other winged ribs between said lateral winged ribs are odd in number with a same protruding dimension and a same gap between them.

8. A hooking device in accordance with claim 1, wherein said casing and nut have square form threads.

9. A hooking device in accordance with claim 1, wherein said casing and nut are in a plastic material comprising fibreglass filler.

10. A hooking device in accordance with claim 9, wherein said plastic material comprises over 30% of fibreglass.

* * * * *